(12) United States Patent
Nagai et al.

(10) Patent No.: US 11,078,375 B2
(45) Date of Patent: Aug. 3, 2021

(54) THERMOPLASTIC RESIN-COATED METAL SHEET, CAN BODY AND CAN LID MADE FROM THE SAME METAL SHEET

(71) Applicant: TOYO SEIKAN GROUP HOLDINGS, LTD., Tokyo (JP)

(72) Inventors: Nobuhiko Nagai, Yokohama (JP); Shuhei Hiromori, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 147 days.

(21) Appl. No.: 14/895,152

(22) PCT Filed: Jun. 16, 2014

(86) PCT No.: PCT/JP2014/065894
§ 371 (c)(1),
(2) Date: Dec. 1, 2015

(87) PCT Pub. No.: WO2014/203857
PCT Pub. Date: Dec. 24, 2014

(65) Prior Publication Data
US 2016/0115346 A1 Apr. 28, 2016

(30) Foreign Application Priority Data
Jun. 21, 2013 (JP) .............................. JP2013-130223

(51) Int. Cl.
*B65D 1/12* (2006.01)
*C09D 167/02* (2006.01)
(Continued)

(52) U.S. Cl.
CPC ............ *C09D 167/02* (2013.01); *B32B 15/08* (2013.01); *B32B 15/09* (2013.01); *B65D 1/12* (2013.01);
(Continued)

(58) Field of Classification Search
CPC .......... B65D 1/12; B65D 1/165; B65D 23/08; B65D 23/0807; B65D 23/0821;
(Continued)

(56) References Cited

U.S. PATENT DOCUMENTS 4,143,790 A * 3/1979 Ueno ..................... B65D 25/14
220/604
4,520,188 A * 5/1985 Holzrichter .......... C08G 63/199
528/274
(Continued)

FOREIGN PATENT DOCUMENTS

CN 101394999 A 3/2009
EP 1149772 A2 10/2001
(Continued)

OTHER PUBLICATIONS

International Search Report for PCT/JP2014/065894 dated Sep. 2, 2014 [PCT/ISA/210].

*Primary Examiner* — Lee E Sanderson
*Assistant Examiner* — Michael C Romanowski
(74) *Attorney, Agent, or Firm* — Sughrue Mion, PLLC

(57) ABSTRACT

A thermoplastic resin-coated metal sheet obtained by coating at least one surface of a metal sheet with a thermoplastic resin via a polyester type primer, wherein the polyester type primer, if it is in the form of a 10 μm-thick dry primer sheet, has a breaking elongation in a range of 9 to 200% at a tension speed of 1000 mm/min. and an MEK extractability in a range of 3 to 40%. Without using a special thermoplastic resin-coated film or surface-treated metal sheet, therefore, the cans and can lids can be formed using the thermoplastic resin-coated metal sheet of the invention maintaining excellent and close adhesion during the working, preventing the can body from breaking and the thermoplastic resin coating from peeling at the flange-forming portion during the work- (Continued)

ing, the cans and can lids excelling in dent resistance and economy.

4 Claims, 2 Drawing Sheets

(51) Int. Cl.
| | |
|---|---|
| *C09D 165/02* | (2006.01) |
| *B32B 15/09* | (2006.01) |
| *B32B 15/08* | (2006.01) |
| *B65D 1/16* | (2006.01) |
| *C09D 5/00* | (2006.01) |
| *C09D 5/08* | (2006.01) |
| *B32B 15/20* | (2006.01) |
| *B32B 1/00* | (2006.01) |
| *B32B 27/18* | (2006.01) |
| *B32B 15/18* | (2006.01) |
| *B32B 7/12* | (2006.01) |
| *B65D 65/42* | (2006.01) |

(52) U.S. Cl.
CPC ............ *B65D 1/165* (2013.01); *C09D 5/002* (2013.01); *C09D 5/08* (2013.01); *C09D 165/02* (2013.01); *B32B 1/00* (2013.01); *B32B 7/12* (2013.01); *B32B 15/18* (2013.01); *B32B 15/20* (2013.01); *B32B 27/18* (2013.01); *B32B 2250/40* (2013.01); *B32B 2255/06* (2013.01); *B32B 2255/205* (2013.01); *B32B 2255/26* (2013.01); *B32B 2255/28* (2013.01); *B32B 2270/00* (2013.01); *B32B 2307/54* (2013.01); *B32B 2307/714* (2013.01); *B32B 2307/732* (2013.01); *B32B 2435/02* (2013.01); *B32B 2439/66* (2013.01); *B65D 65/42* (2013.01)

(58) Field of Classification Search
CPC .... C09D 167/02; C09D 5/002; C09D 167/06; C09D 5/08; B32B 15/08; B32B 15/09; B32B 15/20; B32B 2439/40; B32B 2439/66; B32B 2439/70; B32B 7/12
USPC .............. 428/35.8; 528/271, 272, 302, 308.7
See application file for complete search history.

(56) References Cited

U.S. PATENT DOCUMENTS

| | | | |
|---|---|---|---|
| 8,349,419 B2 * | 1/2013 | Nishida ..................... | B32B 1/02 428/35.9 |
| 2001/0031327 A1 | 10/2001 | Sato et al. | |
| 2009/0226745 A1 * | 9/2009 | Yaoi ......................... | B32B 7/12 428/457 |

FOREIGN PATENT DOCUMENTS

| | | | | |
|---|---|---|---|---|
| JP | 07-195618 A | | 8/1995 | |
| JP | 2000-178416 | * | 6/2000 | ............. C08L 67/02 |
| JP | 2000-178416 A | | 6/2000 | |
| JP | 2001-246695 A | | 9/2001 | |
| JP | 2002-173588 A | | 6/2002 | |
| JP | 2002-348362 | * | 12/2002 | ........... C08G 63/199 |
| JP | 2002-348362 A | | 12/2002 | |
| JP | 2004-250484 A | | 9/2004 | |
| JP | 2005-104146 A | | 4/2005 | |
| JP | 2005-220310 A | | 8/2005 | |
| JP | 2006-037013 A | | 2/2006 | |
| JP | 2007-076012 A | | 3/2007 | |
| JP | 2007-077268 | * | 3/2007 | ............. C08G 63/82 |
| WO | 2007/091740 A1 | | 8/2007 | |

* cited by examiner

THERMOPLASTIC RESIN-COATED METAL SHEET, CAN BODY AND CAN LID MADE FROM THE SAME METAL SHEET

CROSS REFERENCE TO RELATED APPLICATIONS

This application is a National Stage of International Application No. PCT/JP2014/065894 filed Jun. 16, 2014, claiming priority based on Japanese Patent Application No. 2013-130223 filed Jun. 21, 2013, the contents of all of which are incorporated herein by reference in their entirety.

TECHNICAL FIELD

This invention relates to a thermoplastic resin-coated metal sheet, to a can body and to a can lid made from the thermoplastic resin-coated metal sheet. More specifically, the invention relates to a thermoplastic resin-coated metal sheet that maintains excellent and close adhesion during the working, and is capable of providing can bodies and can lids featuring excellent dent resistance and economy.

BACKGROUND ART

There have heretofore been known seamless cans (cans without seam on the side surfaces) formed by drawing, bend-elongating (stretch working) and/or ironing a resin-coated metal sheet that is obtained by coating a metal sheet such as aluminum sheet, tin sheet or tin-free steel sheet with a thermoplastic resin.

In forming seamless cans from the resin-coated metal sheet, it is necessary to satisfy the requirements of close adhesion of the resin coating during the working, shock resistance, flavor-retaining property and corrosion resistance. From the above standpoint, there has heretofore been used a resin-coated metal sheet that is coated with a thermoplastic polyester resin comprising chiefly an ethylene terephthalate unit (patent document 1).

Due to the working that is executed to a high degree, however, the seamless cans formed from the thermoplastic resin-coated metal sheet allow the body portion to be broken or the resin coating to be peeled off at the flange-forming portions during the working. Moreover, the seamless cans are accompanied by a problem of corrosion at dented portions in the can bodies caused by shocks. Dent resistance is a long known characteristic against the denting in case shocks are received. To improve the dent resistance, there have been proposed resin coatings using a polyester resin containing ionomer and a polyester resin containing dimeric acid (patent documents 2 and 3).

To improve close adhesion of the thermoplastic resin coating during the working, further, there have, further, been proposed an art of applying a primer as an underlayer for the thermoplastic resin (patent document 4) and a special surface treatment, such as treating the surface of the metal sheet that is used with a zirconium phosphate and, further, treating the surface thereof with an organic or inorganic acid blended with a phenolic resin (patent document 5).

PRIOR ART DOCUMENTS

Patent Documents

Patent document 1: JP-A-2001-246695
Patent document 2: JP-A-7-195618
Patent document 3: JP-A-2005-104146
Patent document 4: WO 2007/91740 A1
Patent document 5: JP-A-2007-76012

OUTLINE OF THE INVENTION

Problems that the Invention is to Solve

However, special polyester resin coatings such as polyester resin coatings containing ionomer or dimeric acid are expensive and involve a problem in regard to economy if they are to be applied to general seamless cans. As described above, further, even if the primer is applied or the specially surface-treated metal sheet is used, it is not still satisfactory for preventing the occurrence of all of breakage of the body during the working, peeling of the resin at the flange-forming portions and corrosion triggered by denting in the can body.

It is, therefore, an object of the present invention to provide a thermoplastic resin-coated metal sheet that maintains excellent and close adhesion during the working, preventing the can body from breaking and the thermoplastic resin coating from peeling at the flange-forming portion during the working, the thermoplastic resin-coated metal sheet being capable of providing can bodies and can lids featuring excellent dent resistance and economy without the need of using a special thermoplastic resin coating or a specially surface-treated metal sheet.

Another object of the present invention is to provide a thermoplastic resin-coated metal sheet which is free of bisphenol A, and is provided with a primer that helps improve close adhesion of the thermoplastic resin coating during the working and dent resistance.

Means for Solving the Problems

According to the present invention, there is provided a thermoplastic resin-coated metal sheet obtained by coating at least one surface of a metal sheet with a thermoplastic resin via a polyester type primer, wherein the polyester type primer, if it is in the form of a 10 μm-thick dry primer sheet, has a breaking elongation in a range of 9 to 200% at a tension speed of 1000 mm/min. and an MEK extractability in a range of 3 to 40%.

In the thermoplastic resin-coated metal sheet of the present invention, it is desired that:

1. The polyester type primer comprises a polyester resin that contains an aromatic dicarboxylic acid and an aliphatic dicarboxylic acid having 6 to 14 carbon atoms, and a curing agent;

2. The polyester resin contains at least one of sebacic acid, isophthalic acid or terephthalic acid as a dicarboxylic acid component and at least one of ethylene glycol, propylene glycol or cyclohexanedimethanol as a diol component, the sebacic acid being contained in an amount of 8 to 25 mol % relative to the whole polyester resin;

3. The polyester resin contains at least one of sebacic acid, isophthalic acid or terephthalic acid as a dicarboxylic acid component, the sebacic acid being contained in an amount of 8 to 25 mol % relative to the whole polyester resin;

4. The polyester resin contains at least one of cyclohexanedimethanol, ethylene glycol or propylene glycol, the cyclohexanedimethanol being contained in an amount of 15 to 40 mol % relative to the whole polyester resin;

5. The curing agent is contained in an amount of 5 to 43 parts by mass per 100 parts by mass of the polyester resin;

6. The curing agent is a phenolic curing agent and, specifically, a resol type phenolic resin derived from an m-cresol; and 7. The primer layer comprising the polyester type primer has a thickness in a range of 0.1 to 4.5 µm.

According to the present invention, further, there are provided a can body and a can lid comprising the above thermoplastic resin-coated metal sheet.

Effects of the Invention

The thermoplastic resin-coated metal sheet of the present invention features excellent and close adhesion of the thermoplastic resin coating during the working, effectively preventing the can body from breaking and the resin coating from peeling at the flange-forming portion during the working.

Further, the seamless can formed by using the thermoplastic resin-coated metal sheet of the invention features excellent shock resistance and dent resistance without causing corrosion at the dented portions even in case the seamless can is dented upon receiving shocks after it has been filled with a content.

Moreover, the thermoplastic resin-coated metal sheet of the invention uses the polyester type primer containing no bisphenol A, offering excellent hygiene properties and, therefore, making it possible to use the thermoplastic resin coating as the resin coating on the inner surface.

The above-mentioned effects of the thermoplastic resin-coated metal sheet of the invention will also become obvious from the Examples appearing later.

Namely, the thermoplastic resin-coated metal sheet of the invention makes it possible to form seamless cans through severe working maintaining good formability preventing the can bodies from breaking and the resin coating from peeling at the flange-forming portion. Besides, the seamless cans that are obtained have excellent dent resistance (Examples 1 to 25).

On the other hand, if the breaking elongation at a high tension speed and the MEK extractability are larger than the above ranges, excellent dent resistance may be obtained but the resin coating peels at the flange-forming portion (Comparative Example 1). On the other hand, if the breaking elongation at a high tension speed and the MEK extractability are smaller than the above ranges, the can body breaks and the seamless can cannot be formed (Comparative Examples 2 and 3). Further, if the breaking elongation at a high tension speed is smaller than the above range, the dent resistance becomes poor despite the MEK extractability is satisfying the above range (Comparative Examples 4 and 5). In any case, satisfactory seamless cans cannot be obtained.

MODES FOR CARRYING OUT THE INVENTION

In the thermoplastic resin-coated metal sheet of the present invention, an important feature resides in that the polyester type primer positioned between the thermoplastic resin coating and the metal sheet has, if it is in the form of a 10 µm-thick dry primer sheet, a breaking elongation in a range of 9 to 200% and, specifically, 9 to 80% at a tension speed of 1000 mm/min. and an MEK extractability in a range of 3 to 40% and, specifically, 4 to 25%.

By using the polyester type primer satisfying the above properties as contemplated by the present invention, it was found that the seamless cans can be obtained through severe working without causing the can body to be broken or without permitting the resin coating to be peeled at the flange-forming portion, which so far had occurred when the traditional thermoplastic resin-coated metal sheet was subjected to severe working such as draw working, bend-elongation working (stretch working) and/or ironing working. Besides, the seamless cans obtained through severe working exhibit excellent dent resistance.

That is, if the breaking elongation is smaller than the above range, the dent resistance decreases and if the breaking elongation is larger than the above range, the resin coating may peel off at the flange-forming portion. Further, if the MEK extractability is smaller than the above range, the primer stretches insufficiently and the can body may break. If the MEK extractability is larger than the above range, the resin coating may peel off at the flange-forming portion.

Figure 1:
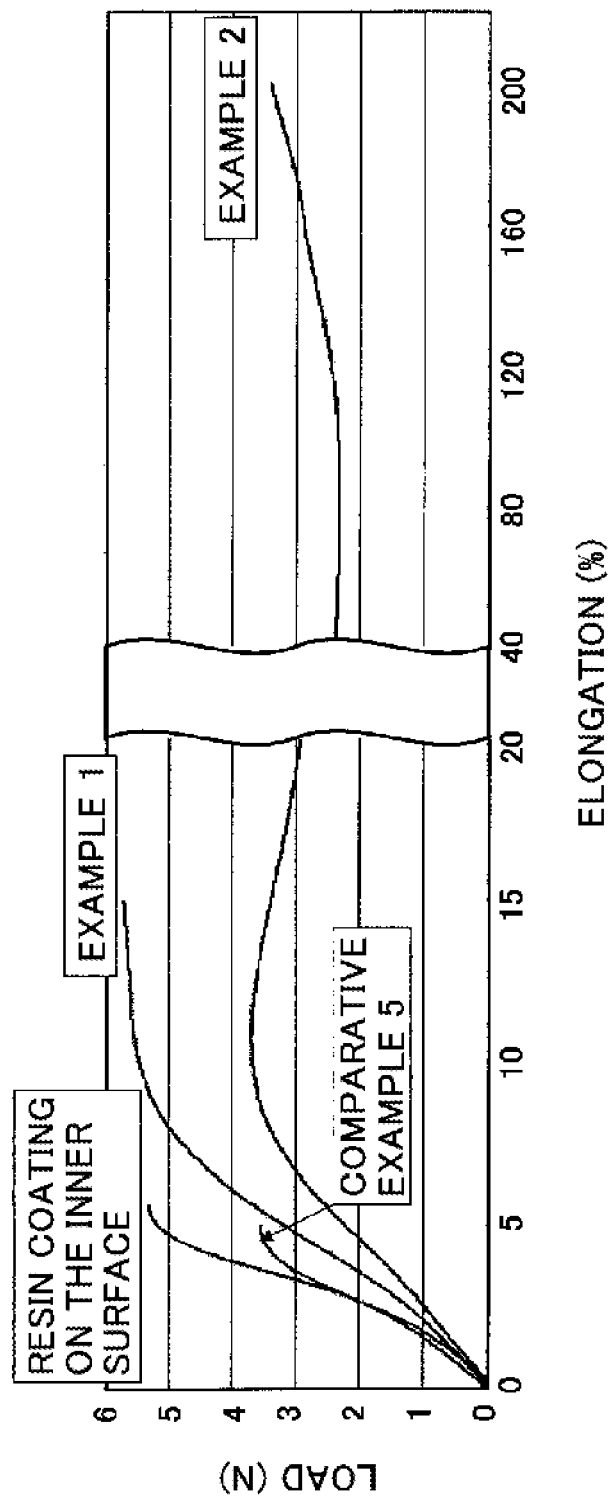
[FIG. 1] is a diagram illustrating the breaking elongations at a high tension speed of polyester type primers used for the thermoplastic resin-coated metal sheet of the present invention.

FIG. 1 shows load vs. elongation curves of the 10 g m-thick dry primer sheets of polyester type primers of the present invention at a tension speed of 1000 mm/min. It will be learned from FIG. 1 that the layer of the polyester type primer used in the present invention has a larger breaking elongation than those of the resin coating on the inner surface (polyester resin on the inner surface of Example 1) and the conventional polyester type primer (Comparative Example 5). Therefore, the layer of the polyester type primer used in the present invention has excellent shock resistance and closely adhering property during the working. Therefore, despite the generally used thermoplastic resin coating is cracked due to shocks, the primer layer is not damaged and continues to protect the metal sheet making it possible to maintain excellent corrosion resistance even when the cans are filled with highly corrosive contents such as acidic beverages.

Moreover, with the MEK extractability lying in the above-mentioned range in the layer of the polyester type primer that is used in the invention, the primer layer is cured to a sufficient degree so that the above-mentioned breaking elongation can be obtained. Therefore, the can body is not broken and the resin coating is prevented from peeling off at the flange-forming portion despite the metal sheet is subjected to the severe working.

(Polyester Type Primers)

It is important that the polyester type primer used for the thermoplastic resin-coated metal sheet of the invention has the breaking elongation and the MEK extractability lying in the above-mentioned ranges. As the polyester type primer having such properties, there can be exemplified, though not limited thereto only, the one that comprises a polyester resin containing an aromatic dicarboxylic acid and an aliphatic dicarboxylic acid having 6 to 14 carbon atoms and, specifically, 8 to 12 carbon atoms, and a curing agent.

[Polyester Resins]

As the aromatic dicarboxylic acid, there can be exemplified terephthalic acid, isophthalic acid, orthophthalic acid, and naphthalenedicarboxylic acid. As the aliphatic dicarboxylic acid having 6 to 14 carbon atoms, there can be exemplified adipic acid, pimelic acid, suberic acid, azelaic acid, and sebacic acid. It is desired that the aliphatic dicarboxylic acid having 6 to 14 carbon atoms is contained in an amount in a range of 8 to 25 mol % relative to the whole polyester resin. If the amount of the aliphatic dicarboxylic acid is smaller than the above range, the tensile breaking elongation decreases and the dent resistance cannot be improved. If the amount of the aliphatic dicarboxylic acid is larger than the above range, the tensile breaking elongation becomes so large as to cause the peeling at the flange-forming portion.

It is desired that the present invention contains, as the dicarboxylic acid components, at least sebacic acid and either isophthalic acid or terephthalic acid.

Particularly desirably, the sebacic acid is contained in an amount of 8 to 25 mol % and, specifically, 9 to 17 mol % relative to the whole polyester resin.

It is desired that together with the sebacic acid contained in the above-mentioned amount, there are further contained terephthalic acid in an amount of 0 to 42 mol % and, specifically, 0 to 20 mol % and isophthalic acid in an amount of 0 to 42 mol % and, specifically, 13 to 41 mol % relative to the whole polyester resin (presuming the total amount of the dicarboxylic acid components to be 50 mol %).

In the invention, the dicarboxylic acid most desirably comprises three components of sebacic acid, terephthalic acid and isophthalic acid, the sebacic acid being contained in an amount in a range of 9 to 17 mol %, the terephthalic acid being contained in an amount in a range of 1 to 20 mol % and the isophthalic acid in an amount in a range of 13 to 40 mol % relative to the whole polyester resin (presuming the total amount of the dicarboxylic acid components to be 50 mol %).

As the diol components, there is no particular limitation and there can be used aliphatic glycols such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 1,6-hexanediol, 3-methyl-1,5-petanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol, and 1,9-nonanediol; ether glycols such as diethylene glycol, triethylene glycol, polyethylene glycol, polypropylene glycol and polyteramethylene glycol; and alicyclic polyalcohols such as 1,4-cyclohexanedimethanol, 1,3-cycohexanedimethanol, 1,2-cyclohexanedimethanol, tricyclodecane glycols and hydrogenated bisphenols; as well as trihydric or more highly hydric polyalcohols such as trimethylolpropane, trimethylolethane and pentaerythritol, which can be used in one kind or in a combination of two or more kinds.

In the invention, it is desired that as the diol components, there are contained the cyclohexanedimethanol and at least either the ethylene glycol or the propylene glycol.

It is, particularly, desired that the cyclohexanedimethanol is contained in an amount of 15 to 40 mol % and, specifically, 23 to 37 mol % relative to the whole polyester resin (presuming the total amount of the diol components to be 50 mol %).

In addition to the cyclohexanedimethanol contained in the above-mentioned amount, it is further desired that there are contained the ethylene glycol in an amount of 0 to 35 mol % and the propylene glycol in an amount of 0 to 35 mol % relative to the whole polyester resin (presuming the total amount of the diol components to be 50 mol %).

In the invention, it is most desired that the diol components includes three components of ethylene glycol, propylene glycol and cyclohexanedimethanol, the cyclohexanedimethanol being contained in an amount of 15 to 40 mol %, the ethylene glycol being contained in an amount of 1 to 20 mol % and the propylene glycol being contained in an amount of 1 to 20 mol % relative to the whole polyester resin (presuming the total amount of the diol components to be 50 mol %).

It is desired that the polyester resin has a number average molecular weight in a range of 3,000 to 100,000, an acid value in a range of 0 to 50 mgKOH/g and a glass transition temperature in a range of −20 to 100° C.

[Curing Agents]

As the curing agent used for the polyester type primer of the invention, there can be used a curable resin having a functional group capable of reacting with the functional group of the polyester resin, i.e., capable of reacting with the carboxyl group or the hydroxyl group. Namely, there can be used the curing agent such as of phenolic resin, isocyanate compound or amino resin. These resins can be used in a single kind or in a combination of two or more kinds.

In the invention, among the above curing agents, a resol type phenol resin derived from an m-cresol can be preferably used.

The resol type phenol resin derived from the m-cresol, more preferably, is a copolymer of a phenolic compound containing not less than 50 mass % of m-cresol and a formaldehyde.

In addition to the above phenolic compound, there can be, further, added to the starting phenolic resin derived from the m-cresol, another phenolic compound such as a bifunctional phenolic compound like o-cresol, p-cresol, p-tert-butylphenol, p-ethylphenol, 2,3-xylenol, or 2,5-xylenol in an amount of less than 50 mass % to such a degree that will not hinder the properties.

The phenolic resin is obtained by methylolating a phenolic resin containing not less than 50 mass % of a phenolic compound with a formalin, paraformaldehyde or trioxane.

[Preparation of the Primer]

The polyester type primer used in the invention can be prepared by dissolving, in an organic solvent, the curing agent in an amount of 5 to 43 parts by mass and, specifically, 10 to 25 parts by mass per 100 parts by mass of the polyester resin.

As a curing catalyst, at this time, it is desired to use an acid catalyst in an amount of 0.01 part by mass to 3 parts by mass per 100 parts by mass of the whole resin components (polyester resin and curing agent). As the acid catalyst, there can be used, for example, sulfuric acid, p-toluenesulfonic acid, dodecylbenzenesulfonic acid, naphthalenesulfonic acid, dinonylnaphthalenesulfonic acid, dinonylnaphthalenedisulfonic acid, camphorsulfonic acid, phosphoric acid and the above acids blocked with an amine (above acids partly or entirely neutralized with an amine compound) in one kind or in a combination of two or more kinds. Among these acid catalysts, it is particularly desired to use dodecylbenzenesulfonic acid or dodecylbenzenesulfonic acid blocked with an amine from the standpoint of compatibility with the resin and hygiene properties.

As the organic solvent, it is desired to use the one that works to plasticize the polyester resin and is amphipathic, like alcohols such as ethanol, n-propanol, isopropanol, n-butanol, isobutanol, sec-butanol, tert-butanol, isoamyl alcohol, sec-amyl alcohol, tert-amyl alcohol, n-hexanol and cyclohexanol; ketones such as methyl ethyl ketone, methyl isobutyl ketone and ethyl butyl ketone; cyclic ethers such as tetrahydrofuran, dioxane and 1,3-dioxolane; glycol derivatives such as ethylene glycol, ethylene glycol monomethyl ether, ethylene glycol monoethyl ether, ethylene glycol monobutyl ether, ethylene glycol monoethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether and propylene glycol methyl ether acetate; as well as 3-methoxy-3-methylbutanol, 3-methoxybutanol, acetonitrile, dimethylformamide, dimethylacetoamide, diacetone alcohol and ethyl acetoacetate.

Thereafter, as required, the organic solvent used for dissolving the polyester resin can be distilled off by heating or under reduced pressure. As for distilling off the organic solvent, it is desired that the organic solvent is distilled off under reduced pressure at not higher than 100° C. and, more preferably, under reduced pressure at not higher than 80° C. from the standpoint of suppressing the phenolic resin from condensing due to the heat during the distillation of the organic solvent. In this case, a perfect aqueous resin composition can be obtained if the organic solvent is all distilled off. From the standpoint of stability of the dispersed body and the film-forming property, however, it is desired that the organic solvent remains contained in an amount of 3 mass % to 20 mass %.

The primer can be applied by a known method such as roll-coating method, spray method, dipping method or by using a brush. The primer coating is baked under the conditions of, preferably, 100 to 300° C. for 5 seconds to 30 minutes and, more preferably, 150 to 270° C. for 15 seconds to 15 minutes.

The primer coating has a thickness in a range of 0.1 to 4.5 µm and, specifically, 0.4 to 2.7 µm in the form of a dry film. If the thickness of the primer coating is smaller than the above range, desired dent resistance may not often be obtained. If the thickness thereof is larger than the above range, on the other hand, an extended period of time is required for baking the primer deteriorating the productivity. Besides, if the baking is not sufficient, the MEK extractability increases and the resin coating may peel off at the flange-forming portion.

The primer coating having a large thickness helps improve corrosion resistance. By controlling the primer coating within the above-mentioned range, therefore, it is made possible to cope with highly corrosive acidic beverages containing, for example, salt at high concentrations.
(Thermoplastic Resin Coating)

In the thermoplastic resin-coated metal sheet of the invention, there is no particular limitation on the thermoplastic resin that is applied onto the metal sheet via the primer. For example, there can be used a plastic film of a thermoplastic resin which comprises polyolefins such as crystalline polypropylene, crystalline propylene-ethylene copolymer, crystalline polybutene-1, crystalline poly 4-methylpentene-1, low-, medium- or high-density polyethylene, ethylene-vinyl acetate copolymer (EVA), ethylene-ethyl acrylate copolymer (EEA), and ionically crosslinked olefin copolymer (ionomer); aromatic vinyl copolymers such as polystyrene and styrene-butadiene copolymer; vinyl halide polymers such as polyvinyl chloride and vinylidene chloride resin; nitryl polymers such as acrylonitryl-styrene copolymer and acrylonitryl-styrene-butadiene copolymer; polyamides such as nylon 6, nylon 66 and para- or metaxylyleneadipamide; polyesters such as polyethylene terephthalate (PET) and polytetramethylene terephthalate; various kinds of polycarbonates; and polyacetals such as polyoxymethylene.

In the invention, among the above thermoplastic resins, the polyester resin can be used particularly favorably.

The polyester resin that can be favorably used may be a homopolyethylene terephthalate but may also be a copolymerizable simple polyester or a blend of polyester that contains acid components other than the terephthalic acid in an amount of not more than 30 mol % on the basis of acid components or contains alcohol components other than the ethylene glycol in an amount of not more than 30 mol % on the basis of alcohol components.

As the acid components other than the terephthalic acid, there can be exemplified isophthalic acid, naphthalenedicarboxylic acid, cyclohexanedicarboxylic acid, P-β-oxyethoxybenzoic acid, diphenoxyethane-4,4'-dicarboxylic acid, 5-sodiumsulfoisophthalic acid, hexahydroterephthalic acid, succinic acid, adipic acid, sebacic acid, dodecanedioic acid, dimeric acid, trimellitic acid, and pyromellitic acid.

As the alcohol components other than the ethylene glycol, there can be exemplified glycol components such as propylene glycol, 1,4-butanediol, neopentyl glycol, 1,6-hexylene glycol, diethylene glycol, triethylene glycol, cyclohexanedimethanol, ethylene oxide adduct of bisphenol A, trimethylolpropane and pentaerythritol.

Specifically, it is desired to use any one of polyethylene terephthalate, polyethylene terephthalate copolymerized with isophthalic acid, polyethylene terephthalate copolymerized with naphthalenedicarboxylic acid, or a blend of polyethylene terephthalate and polybutylene terephthalate.

The polyester resin should have a molecular weight in a range large enough for forming a film, an intrinsic viscosity [η] of not less than 0.5 and, specifically, in a range of 0.52 to 0.70 as measured by using, as a solvent, a mixed solvent of phenol and tetrachloroethane from the standpoint of barrier property against corrosive components and mechanical properties, and a glass transition point of not lower than 50° C. and, specifically, in a range of 60° C. to 80° C.

The polyester film can be blended with the blending agents for films known per se., such as lubricating agent, anti-blocking agent, pigment, various antistatic agents and antioxidant according to recipe known per se.

The thermoplastic resin may be formed into a film and may then be applied onto the metal sheet by the heat-adhesion method, or may be extruded in its heated and molten state into a film by using an extruder and may then be applied directly onto the metal sheet by the extrusion-lamination method.

If the thermoplastic resin is to be formed into a film and is, thereafter, applied, the film may have been stretched. Desirably, however, the film should not have been stretched from the standpoint of formability and dent resistance.

It is desired that the polyester film has a thickness, usually, in a range of 5 to 40 µm.

The thermoplastic resin coating can be formed in two layers. In this case, the lower layer chiefly comprises the ethylene terephthalate unit and contains at least one of isophthalic acid, naphthalenedicarboxylic acid or the like acid in an amount of 1 to 30 mol %. And the lower layer comprises a polyester resin that contains the above acid components in amounts larger than the polyester film which becomes the upper layer from the standpoint of, specifically, close adhesion during the working and dent resistance.
(Metal Sheets)

As the metal sheet to be coated with the thermoplastic resin via the polyester type primer according to the present invention, it is allowable to use a cold-rolled steel sheet, a surface-treated steel sheet, a pure aluminum sheet, an aluminum sheet such as aluminum alloy sheet and a surface-treated aluminum sheet of which the surface has been treated, that have heretofore been used being coated with a resin.

As the surface-treated steel sheet, there can be exemplified steel sheets, i.e., SR material and DR material obtained by subjecting a cold-rolled steel sheet to the annealing and, thereafter, to the temper-rolling or to the secondary cold-rolling followed by one or two or more kinds of the surface treatments such as zinc plating, tin plating, nickel plating, electrolytic chromate treatment, chromate treatment and phosphate treatment.

As the surface-treated aluminum sheet, there can be exemplified those obtained by subjecting the aluminum sheet to the inorganic surface treatment such as treatment with chromic phosphate, treatment with zirconium phosphate or treatment with phosphoric acid, and those obtained by subjecting the aluminum sheet to the organic surface treatment such as treatment with polyacrylic acid, phenolic resin, tannic acid, itaconic acid or phosphonic acid, or to the organic/inorganic composite surface treatment comprising a combination thereof.

In the invention, in particular, there can be preferably used a surface-treated aluminum sheet subjected to the treatment with zirconium phosphate, treatment with chromic phosphate, treatment with phenolic resin and zirconium phosphate, or an aluminum sheet having its surface that has not been treated.

The metal sheet has a thickness that may vary depending on the kind of the metal, use of the laminated material or the size thereof but, usually, has a thickness of 0.10 to 0.50 mm. In the case of the surface-treated steel sheet, the thickness is desirably 0.10 to 0.30 mm and in the case of the aluminum sheet, the thickness is desirably 0.15 to 0.40 mm.

(Thermoplastic Resin-Coated Metal Sheet and its Production)

In producing the thermoplastic resin-coated metal sheet of the present invention, the metal sheet can be coated with the thermoplastic resin by any means, such as preparing a thermoplastic resin film in advance by a known method and laminating it on a metal sheet coated with the polyester type primer. Or coating the thermoplastic film with the primer, and laminating the thermoplastic film on the metal sheet. Or forming the thermoplastic resin film by the extrusion-coating method directly on the metal sheet that has been coated with the polyester type primer.

Figure 2:
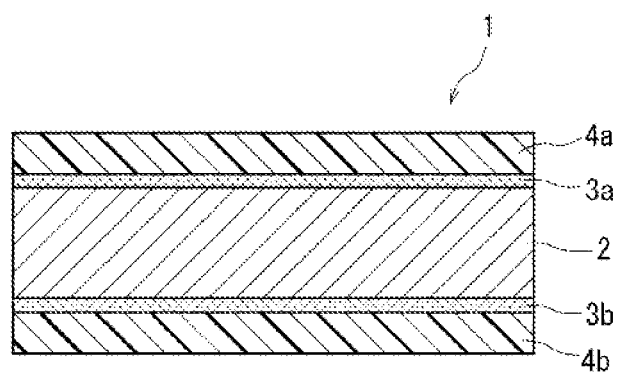
[FIG. 2] is a view illustrating the structure in cross section of the thermoplastic resin-coated metal sheet of the present invention.

FIG. 2 illustrates in cross section the structure of the thermoplastic resin-coated metal sheet of the invention. The thermoplastic resin-coated metal sheet 1 includes a metal sheet 2, a layer 3a of the polyester type primer that is provided on the inner surface side of the container, and a thermoplastic resin layer 4a. In the embodiment of FIG. 2, a thermoplastic resin layer 4b is also formed on the metal sheet 2 on the outer surface side of the container via a layer 3b of the polyester type primer. In the thermoplastic resin-coated metal sheet of the invention, however, the thermoplastic resin coating may at least be formed on the surface that becomes the inner surface of the can body or the can lid.

(Can Body and its Production)

The can body can be produced by using the thermoplastic resin-coated metal sheet of the invention according to a conventional forming method in a manner that the surface coated with the thermoplastic resin becomes the inner surface of the can.

In the thermoplastic resin-coated metal sheet of the invention, the thermoplastic resin coating maintains excellent and close adhesion during the working and makes it possible to form a seamless can through severe working, such as drawing, draw• deep drawing, draw• ironing, or draw• bend-stretch• ironing without causing the can body to be broken or the resin coating to be peeled at the flange-forming portion.

It is desired that the thickness of the side wall of the seamless can has been reduced down to 20 to 95% and, specifically, 25 to 85% of the original thickness of the thermoplastic resin-coated metal plate due to the bend-stretching or ironing as a result of subjecting the thermoplastic resin-coated metal sheet to the draw-redraw working.

The obtained seamless can is subjected to at least one stage of heat treatment to remove residual stress that developed in the film due to the working. The lubricant used during the working is volatilized from the surfaces and, further, the ink printed on the surface is dried and cured. The container after heat-treated is quickly cooled or is left to cool. As desired, the container is subjected to the necking of one stage or a plurality of stages and then to the flanging to obtain a can for wrap-seaming.

(Can Lid and its Production)

The can lid can be formed by using the thermoplastic resin-coated metal sheet of the invention according to a known method of producing can lids but so forming the can lid that the surface coated with the thermoplastic resin becomes the inner surface side of the can lid.

The shape of the can lid, too, may comprise with the known shape such as of easy-open end having a score for forming an opening for pouring out the content and a tab for unsealing.

EXAMPLES

Example 1

[Preparation of the Primer]

Described below are how to prepare the polyester type primer of the present invention and the primer for comparison. In the following description and in Table 1, "parts" are all "by mass".

Preparation of the Polyester Resin.

110 Parts of terephthalic acid, 194 parts of isophthalic acid, 115 parts by weight of sebacic acid, 34 parts of ethylene glycol, 62 parts of propylene glycol, 265 parts of cyclohexanedimethanol, and 0.16 parts of titanium tetrabutoxide were fed into a 2-liter four neck distillation flask, gradually heated up to 220° C. over a period of 4 hours, and were subjected to the esterification reaction while distilling water off. After a predetermined amount of water was distilled off, the pressure was decreased down to 10 mmHg over a period of 30 minutes to conduct the preliminary polymerization, and the temperature was elevated up to 250° C. Further, under a pressure of not higher than 1 mmHg, the post polymerization was conducted for 50 minutes. The polymerization under reduced pressure was halted, and the resin was taken out, i.e., the polyester resin was obtained. Mole ratios of the obtained polyester resin components were as shown in Table 1.

Preparation of the Curing Agent.

100 Parts of m-cresol, 180 parts of 37 mass % formalin aqueous solution and 1 part of sodium hydroxide were added up together, and were reacted at 60° C. for 3 hours. Thereafter, the reaction product was dehydrated under reduced pressure at 50° C. for 1 hour. Next, 100 parts of n-butanol was added thereto to conduct the reaction at 110° C. for 4 hours. After the reaction, the obtained solution was filtered to thereby prepare a resol type phenolic resin derived from the m-cresol.
Preparation of the Primer.

100 Parts of the obtained polyester resin and a solvent were put into a flask, heated, and the polyester resin was dissolved therein with good stirring at not higher than 100° C. After completely dissolved, the mixture was cooled down to room temperature, and to which were added 15 parts of a predetermined resol type phenolic resin and 2 parts of a curing catalyst with good stirring to prepare a polyester type primer. There was used a curing catalyst (Cycat 602 manufactured by Nihon Cytec Industries Co.).
[Production of the Thermoplastic Resin-Coated Metal Sheet]

A surface-treated metal sheet was prepared by conversion-treating both surfaces of a 0.28 mm-thick sheet of an aluminum alloy, JIS3104, with the "Alodine N-405" manufactured by Nihon Parkerizing Co. to form a surface-treating film of zirconium phosphate thereon. The surface of the surface-treated metal sheet that becomes the inner surface side of the can was roll-coated with the above polyester type primer which was then fired at 250° C. to form a primer of a thickness of 0.9 μm. The thus surface-treated metal sheet was taken up.

While rewinding the primer-coated surface-treated metal sheet, the thermoplastic resin was heat-laminated on both surfaces thereof by the extrusion-coating method. As the thermoplastic resin coating on the inner surface side of the can, there was formed the thermoplastic resin coating of a two-layer constitution comprising the lower layer of a 8 μm-thick polyethylene terephthalate containing 15 mol % of isophthalic acid (hereinafter described as "PET/IA15" and the upper layer of a 8 μm-thick PET/IA2. The thermoplastic resin coating on the outer surface side of the can was the thermoplastic resin coating of a two-layer constitution comprising the lower layer of a 7 μm-thick PET/IA15 and the upper layer of a 3 μm-thick PET/IA7.5. Thereafter, the glamour wax was applied onto the inner and outer surfaces thereof, and the thermoplastic resin-coated metal sheet was taken up and was thus produced.
[Forming the Seamless Can]

The thermoplastic resin-coated metal sheet was blanked, draw-ironed, trimmed at its open end to a predetermined size, heat-set at 200° C. for 30 seconds, printed, coated with a finishing varnish, baked at 200° C. for 40 seconds, necked at its open end, and was flanged to obtain a seamless can of a capacity of 500 ml having a can body of 211-diameter and a neck portion of 206-diameter.

Examples 2 to 24 and Comparative Examples 1 to 5

Thermoplastic resin-coated metal sheets and seamless cans were produced in the same manner as in Example 1 but changing the primer composition, primer thickness and the metal sheets (surface-treating species) as shown in Table 1.

As for the primers of Examples 2 to 24 and Comparative Examples 1 to 5, the polyester resins shown in Table 1 were prepared by varying the amounts of monomers in the polyester resin components in the same manner as the above-mentioned Example of synthesis. Further, the primers were so prepared that the ratios of the polyester resin and the curing agent were as shown in Table 1. The curing agent used in Example 23 was a blocked isocyanate compound (VESTANAT B1370 manufactured by Epock Dexer Japan Co.) while the curing agent used in Example 24 was an amino type resin (Mycoat 506 manufactured by Nihon Cytec Industries Co.).

Further, the chromic phosphate surface treatment in Example 21 was the conversion treatment with the Alchrome K702 manufactured by Nihon Parkerizing Co. The surface, however, was not treated in Example 22.

Example 25

A thermoplastic resin-coated metal sheet was produced in the same manner as in Example 1 but treating both surfaces of a 0.185 mm-thick cold-rolled low-carbon steel sheet with the chromate by an ordinary cathode electrolytic method, and from which a seamless can of a capacity of 200 ml having a can body of 202-diameter and a neck portion of 200-diameter was prepared by the same method as that of Example 1 and was evaluated in the same manner as in Example 1.
(Method of Evaluation)
[Formability (Resistance Against Breakage of the can Body)]

Five hundred cans were formed by the above draw-ironing. If one or more can bodies were broken, the formability was evaluated to be ×. If there was no can body that was broken, the formability was evaluated to be ○.
[Peeling at a Portion Corresponding to the Flange (Close Adhesion During the Working)]

The inner surface of the seamless can after having been heat-set was examined at its open end (trimmed portion) and was measured for its length of metal exposure from the open end (length of peeled portion) by using a magnifying glass. Twenty cans were examined, and their maximum peeling lengths were evaluated on the following basis.

⊚: Maximum peeling length was zero.
○: Maximum peeling length was less than 0.1 mm.
Δ: Maximum peeling length was 0.1 mm to less than 0.5 mm.
X: Maximum peeling length was not less than 0.5 mm.
[Corrosion Resistance at Lower Dented Portion]

The obtained seamless can was filled with the commercially available Coca-Cola (registered trademark) at 5° C., and with which a stay-on tab lid was double-seamed. The can was maintained at room temperature with hot water of 35° C. and was stored in a constant-temperature vessel maintained at 5° C. for one day. A block was caused to fall on the can body 2 mm above the upper end of the chime at 5° C. so that the can body was dented over a length of about 15 mm in the circumferential direction thereof. After stored upright at 37° C. for 6 months, the can was opened and the corroded state of the dented portion was checked from the inner surface side of the can. The can was evaluated on the following basis.

⊚: There was no corrosion on the dented portion.
○: There were spots of corrosion on the dented portion, the spots being not more than 2.
Δ: There were 3 or more spots of corrosion.
X: The dented portion was corroded over the whole surface.
[Breaking Elongation at High Tension Speed]

The obtained polyester type primer was applied onto a Teflon (registered trademark) sheet and was baked at 185° C. for 10 minutes so that the primer after dried assumed a thickness of 10 μm. The primer film was removed from the Teflon sheet to obtain a dry primer sheet. The sheet was cut into a short strip 35 mm long and 15 mm wide, and was chucked by a tension tester in a manner that the length of the measuring portion was 25 mm. The tension speed was as high as 1000 mm/min. Measurement was taken three times to find an average value of breaking elongation (%). Measurement was taken in a constant-temperature room maintained at 25° C. The breaking elongation (%) was calculated according to the following formula.

Breaking elongation(%)=(elongation(mm) at breakage×100)/length of measuring portion(mm)

[MEK Extractability]

The primer-coated surface-treated metal sheet prior to being coated with the thermoplastic resin was measured for its MEK extractability (%) in a manner as described below.

A test sheet measuring 10 cm×10 cm was cut out from the primer-coated surface-treated metal sheet, measured for its weight (A) and was dipped in the boiling methyl ethyl ketone (MEK) for 60 minutes. Thereafter, the primer-coated surface-treated metal sheet was taken out, dried, and was measured for its weight (B). Thereafter, the primer layer was removed with the concentrated sulfuric acid, and the surface-treated metal sheet was measured for its weight (C). The value calculated as follows was regarded to be the MEK extractability (%).

MEK extractability(%)=(A−B)×100/(A−C)

TABLE 1

| | | Polyester resin (pts) | Curing agent (pts)* | | | Polyester components (mole ratio) | | | | | |
|---|---|---|---|---|---|---|---|---|---|---|---|
| | | | | | | Dicarboxylic acid components | | | Diol components | | |
| | | | A | B | C | *1 | *2 | *3 | *4 | *5 | *6 |
| Ex. | 1 | 100 | 15 | | | 14.5 | 25.5 | 10.0 | 8.0 | 12.0 | 30.0 |
| | 2 | 100 | 11 | | | 25.0 | 0.0 | 25.0 | 20.0 | 30.0 | 0.0 |
| | 3 | 100 | 5 | | | 21.5 | 8.5 | 20.0 | 16.0 | 24.0 | 10.0 |
| | 4 | 100 | 18 | | | 18.8 | 15.0 | 16.2 | 12.9 | 19.4 | 17.7 |
| | 5 | 100 | 15 | | | 18.6 | 15.6 | 15.8 | 12.6 | 19.0 | 18.4 |
| | 6 | 100 | 15 | | | 16.1 | 21.5 | 12.4 | 9.9 | 14.8 | 25.3 |
| | 7 | 100 | 5 | | | 14.5 | 25.5 | 10.0 | 8.0 | 12.0 | 30.0 |
| | 8 | 100 | 11 | | | 14.5 | 25.5 | 10.0 | 8.0 | 12.0 | 30.0 |
| | 9 | 100 | 25 | | | 14.5 | 25.5 | 10.0 | 8.0 | 12.0 | 30.0 |
| | 10 | 100 | 43 | | | 14.5 | 25.5 | 10.0 | 8.0 | 12.0 | 30.0 |
| | 11 | 100 | 15 | | | 14.5 | 25.5 | 10.0 | 8.0 | 12.0 | 30.0 |
| | 12 | 100 | 15 | | | 14.5 | 25.5 | 10.0 | 8.0 | 12.0 | 30.0 |
| | 13 | 100 | 15 | | | 14.5 | 25.5 | 10.0 | 8.0 | 12.0 | 30.0 |
| | 14 | 100 | 15 | | | 14.5 | 25.5 | 10.0 | 8.0 | 12.0 | 30.0 |
| | 15 | 100 | 15 | | | 14.5 | 25.5 | 10.0 | 8.0 | 12.0 | 30.0 |
| | 16 | 100 | 15 | | | 0.0 | 40.0 | 10.0 | 8.0 | 12.0 | 30.0 |
| | 17 | 100 | 15 | | | 40.0 | 0.0 | 10.0 | 8.0 | 12.0 | 30.0 |
| | 18 | 100 | 15 | | | 14.5 | 27.5 | 8.0 | 8.0 | 12.0 | 30.0 |
| | 19 | 100 | 15 | | | 14.5 | 25.5 | 10.0 | 0.0 | 30.0 | 20.0 |
| | 20 | 100 | 15 | | | 14.5 | 25.5 | 10.0 | 30.0 | 0.0 | 20.0 |
| | 21 | 100 | 15 | | | 14.5 | 25.5 | 10.0 | 8.0 | 12.0 | 30.0 |
| | 22 | 100 | 15 | | | 14.5 | 25.5 | 10.0 | 8.0 | 12.0 | 30.0 |
| | 23 | 100 | | 11 | | 14.5 | 25.5 | 10.0 | 8.0 | 12.0 | 30.0 |
| | 24 | 100 | | | 11 | 14.5 | 25.5 | 10.0 | 8.0 | 12.0 | 30.0 |
| | 25 | 100 | 15 | | | 14.5 | 25.5 | 10.0 | 8.0 | 12.0 | 30.0 |
| Comp. Ex. | 1 | 100 | 3 | | | 25.0 | 0.0 | 25.0 | 20.0 | 30.0 | 0.0 |
| | 2 | 100 | 67 | | | 14.5 | 25.5 | 10.0 | 8.0 | 12.0 | 30.0 |
| | 3 | 100 | 100 | | | 14.5 | 25.5 | 10.0 | 8.0 | 12.0 | 30.0 |
| | 4 | 100 | 25 | | | 11.8 | 31.9 | 6.3 | 5.0 | 7.5 | 37.5 |
| | 5 | 100 | 11 | | | 7.5 | 42.5 | 0.0 | 0.0 | 0.0 | 50.0 |

| | | Film thickness (μm) | Surface-treat species | Breaking elongation at high tension speed (%) | MEK extractability (%) | Evaluation | | Corrosion resistance at lower dent |
|---|---|---|---|---|---|---|---|---|
| | | | | | | Can making adaptability | | |
| | | | | | | *7 | *8 | |
| Ex. | 1 | 0.9 | Zr phosphate | 15 | 14 | ○ | ◎ | ◎ |
| | 2 | 0.9 | Zr phosphate | 200 | 27 | ○ | Δ | ◎ |
| | 3 | 0.9 | Zr phosphate | 100 | 40 | ○ | Δ | ◎ |
| | 4 | 0.9 | Zr phosphate | 80 | 7 | ○ | ○ | ◎ |
| | 5 | 0.9 | Zr phosphate | 50 | 14 | ○ | ○ | ◎ |
| | 6 | 0.9 | Zr phosphate | 20 | 9 | ○ | ○ | ◎ |
| | 7 | 0.9 | Zr phosphate | 18 | 25 | ○ | ◎ | ◎ |
| | 8 | 0.9 | Zr phosphate | 16 | 21 | ○ | ◎ | ◎ |
| | 9 | 0.9 | Zr phosphate | 10 | 6 | ○ | ◎ | ◎ |
| | 10 | 0.9 | Zr phosphate | 9 | 3 | ○ | Δ | ◎ |
| | 11 | 4.5 | Zr phosphate | 15 | 27 | ○ | Δ | ◎ |
| | 12 | 2.7 | Zr phosphate | 15 | 14 | ○ | ○ | ◎ |
| | 13 | 1.9 | Zr phosphate | 15 | 14 | ○ | ◎ | ◎ |
| | 14 | 0.4 | Zr phosphate | 15 | 14 | ○ | ◎ | ○ |
| | 15 | 0.1 | Zr phosphate | 15 | 14 | ○ | Δ | Δ |
| | 16 | 0.9 | Zr phosphate | 15 | 14 | ○ | ○ | ◎ |
| | 17 | 0.9 | Zr phosphate | 15 | 14 | ○ | Δ | ◎ |

TABLE 1-continued

| | | | | | | | | | |
|---|---|---|---|---|---|---|---|---|---|
| | 18 | 0.9 | Zr phosphate | 10 | 14 | ○ | ○ | ○ |
| | 19 | 0.9 | Zr phosphate | 15 | 14 | ○ | ○ | ◎ |
| | 20 | 0.9 | Zr phosphate | 15 | 14 | ○ | ○ | ◎ |
| | 21 | 0.9 | Cr phosphate | 15 | 14 | ○ | ◎ | ◎ |
| | 22 | 0.9 | none | 15 | 14 | ○ | ○ | ◎ |
| | 23 | 0.9 | Zr phosphate | 11 | 9 | ○ | ○ | ○ |
| | 24 | 0.9 | Zr phosphate | 10 | 10 | ○ | ○ | ○ |
| | 25 | 0.9 | chromate | 15 | 14 | ○ | ◎ | ◎ |
| Comp. Ex. | 1 | 0.9 | Zr phosphate | 250 | 42 | ○ | X | ◎ |
| | 2 | 0.9 | Zr phosphate | 6 | 2 | X | — | — |
| | 3 | 0.9 | Zr phosphate | 6 | 1 | X | — | — |
| | 4 | 0.9 | Zr phosphate | 7 | 20 | ○ | ○ | X |
| | 5 | 0.9 | Zr phosphate | 5 | 14 | ○ | ◎ | X |

*A: Phenolic resin,
*B: Isocyanate compound,
*C: Amino type resin
*1: Terephthalic acid,
*2: Isophthalic acid,
*3: Sebacic acid,
*4: Ethylene glycol,
*5: Propylene glycol,
*6: Cyclohexanedimethanol
*7: Resistance of can body against breakage
*8: Peeling at flange portion

INDUSTRIAL APPLICABILITY

The thermoplastic resin-coated metal sheet of the present invention does not suffer breakage of drum or peeling of resin coating despite it is subjected to such severe working as draw• ironing or draw• bend-elongation• ironing, and can, therefore, be favorably used for forming seamless cans through these workings.

Besides, the thermoplastic resin-coated metal sheet of the invention is coated with the thermoplastic resin via the polyester type primer coating that has a large breaking elongation at the time of high tension speed. Namely, even in case the coating of the generally used thermoplastic resin is cracked upon receiving shocks, the primer coating does not break and maintains excellent dent resistance and corrosion resistance. Therefore, the thermoplastic resin-coated metal sheet can be favorably used for forming can bodies and can lids for containing highly corrosive contents such as acidic beverages and the like.

DESCRIPTION OF REFERENCE NUMERALS

1—thermoplastic resin-coated metal sheet
2—metal sheet
3—polyester type primer layer
4—thermoplastic resin layer

The invention claimed is:

1. A seamless can formed from a thermoplastic resin-coated metal sheet obtained by coating at least one surface of a metal sheet with a thermoplastic resin coating via an intervening polyester primer layer comprising a polyester primer, wherein
said polyester primer comprises a polyester resin and a curing agent,
said polyester resin consists of 50 mol % of dicarboxylic acid components and 50 mol % of diol components,
the dicarboxylic acid components consist of sebacic acid, isophthalic acid, and optionally terephthalic acid, where the sebacic acid is contained in an amount of 8 to 16.2 mol %, the isophthalic acid is contained in an amount of 15 to 40 mol %, and the terephthalic acid is contained in an amount of 0 to 18.8 mol % based on the total amount of dicarboxylic acid components and diol components of the polyester resin, and
the diol components consist of cyclohexanedimethanol and at least one of ethylene glycol or propylene glycol, where the cyclohexanedimethanol is contained in an amount of 17.7 to 30 mol % and the ethylene glycol and/or the propylene glycol is contained in an amount of greater than 0 to 30 mol % based on the total amount of dicarboxylic acid components and diol components of the polyester resin,
said curing agent being at least one selected from the group consisting of a phenol resin, an isocyanate compound, and an amino resin, and being contained in an amount of 5 to 15 parts by mass per 100 parts by mass of said polyester resin,
said polyester primer layer has a thickness in a range of 0.4 to 2.7 μm,
said polyester primer, when prepared for testing in the form of a 10 μm thick dry primer sheet, has a breaking elongation in a range of 10 to 50% at a tension speed of 1,000 mm/min and an MEK extractability in a range of 9 to 27%,
said thermoplastic resin coating comprises a polyester film and has a thickness in a range of 5 to 40 μm, and
said thermoplastic resin coating is formed in two layers including a lower layer and an upper layer, the lower layer comprises a polyester resin based on an ethylene terephthalate unit containing 1 to 30 mol % of at least one of isophthalic acid or naphthalenedicarboxylic acid, and the upper layer comprises a polyester resin based on an ethylene terephthalate unit containing isophthalic acid or naphthalenedicarboxylic acid in an amount smaller than the amount of the isophthalic acid or the naphthalene dicarboxylic acid contained in the lower layer.

2. The seamless can formed from a thermoplastic resin-coated metal sheet according to claim 1, wherein said curing agent is the phenolic resin.

3. The seamless can formed from a thermoplastic resin-coated metal sheet according to claim 1, wherein said curing agent is a resol type phenolic resin derived from an m-cresol.

4. The seamless can formed from a thermoplastic resin-coated metal sheet according to claim 1, wherein the polyester resin of the polyester primer is polymerized using titanium tetrabutoxide as a polymerization catalyst.

* * * * *